US006484095B2

(12) United States Patent
Wong et al.

(10) Patent No.: US 6,484,095 B2
(45) Date of Patent: Nov. 19, 2002

(54) VEHICLE OPERATION AND POSITION RECORDING SYSTEM INCORPORATING GPS

(75) Inventors: Carlos C. H. Wong, Tuen Mun (HK); Leo S. C. Tsoi, Tuen Mun (HK)

(73) Assignee: Satellite Devices Ltd., Hong Kong (CN)

( * ) Notice: Subject to any disclaimer, the term of this patent is extended or adjusted under 35 U.S.C. 154(b) by 0 days.

(21) Appl. No.: 09/811,264

(22) Filed: Mar. 16, 2001

(65) Prior Publication Data

US 2002/0029109 A1 Mar. 7, 2002

Related U.S. Application Data

(60) Provisional application No. 60/210,225, filed on Jun. 6, 2000.

(51) Int. Cl.[7] .................... G01C 21/00

(52) U.S. Cl. .................... 701/213; 701/213; 701/35; 340/995

(58) Field of Search .................... 701/213, 35, 207, 701/208; 340/995, 438, 441; 342/357; 455/456

(56) References Cited

U.S. PATENT DOCUMENTS

| | | | | | |
|---|---|---|---|---|---|
| 3,568,161 | A | | 3/1971 | Knickel | 340/992 |
| 3,662,267 | A | | 5/1972 | Reed | 340/993 |
| 4,899,285 | A | | 2/1990 | Nakayama et al. | 701/200 |
| 5,068,656 | A | | 11/1991 | Sutherland | 340/989 |
| 5,142,281 | A | | 8/1992 | Park | 340/991 |
| 5,179,519 | A | | 1/1993 | Adachi | 701/216 |
| 5,220,509 | A | | 6/1993 | Takemura et al. | 701/216 |
| 5,293,318 | A | | 3/1994 | Fukushima | 701/216 |
| 5,381,128 | A | * | 1/1995 | Kaplan | 340/426 |
| 5,383,128 | A | * | 1/1995 | Nishida et al. | 318/439 |
| 5,416,712 | A | | 5/1995 | Geier | 701/216 |
| 5,570,087 | A | | 10/1996 | Lemelson | 340/870.05 |
| 5,604,765 | A | | 2/1997 | Bruno et al. | 375/141 |
| 5,640,139 | A | | 6/1997 | Egeberg | 340/426 |
| 5,751,245 | A | | 5/1998 | Janky | 342/357.07 |
| 5,831,519 | A | | 11/1998 | Pedersen et al. | 340/425.5 |
| 5,844,473 | A | | 12/1998 | Kaman | 340/439 |
| 5,906,655 | A | | 5/1999 | Fan | 701/216 |
| 5,963,129 | A | | 10/1999 | Warner | 340/468 |
| 5,999,124 | A | | 12/1999 | Sheynblat | 342/357.09 |
| 6,021,371 | A | | 2/2000 | Fultz | 701/200 |
| 6,047,192 | A | | 4/2000 | Maloney et al. | 455/456 |
| 6,061,551 | A | | 5/2000 | Sorrells | 455/118 |
| 6,091,359 | A | | 6/2000 | Geier | 342/357.14 |
| 6,088,635 | A | * | 7/2000 | Cox et al. | 701/19 |
| 6,088,636 | A | * | 7/2000 | Chigumira et al. | 701/214 |
| 6,111,541 | A | | 8/2000 | Karmel | 342/357.13 |
| 6,141,609 | A | * | 10/2000 | Herdeg et al. | 701/35 |
| 6,173,176 | B1 | | 1/2001 | Worger et al. | 455/428 |
| 6,204,812 | B1 | | 3/2001 | Fattouche et al. | 342/457 |
| 6,278,921 | B1 | | 8/2001 | Harrison et al. | 701/35 |
| 6,292,132 | B1 | | 9/2001 | Wilson | 342/357.02 |
| 6,324,453 | B1 | * | 11/2001 | Breed et al. | 701/45 |
| 6,330,452 | B1 | | 12/2001 | Fattouche et al. | 455/456 |
| 6,334,086 | B1 | * | 12/2001 | Park et al. | 701/117 |

OTHER PUBLICATIONS

Published Application US2001/0014604, Kingdon et al, published Aug. 16, 2001.

* cited by examiner

*Primary Examiner*—William A. Cuchlinski, Jr.
*Assistant Examiner*—Marthe Y. Marl-Coleman
(74) *Attorney, Agent, or Firm*—Michael de Angeli

(57) ABSTRACT

An in-vehicle positional recording device records the positions of a moving vehicle into a storage medium while the vehicle is operating. The stored positional data are later retrieved for subsequent analysis. In one embodiment, the recording device includes a control unit, an interface to a GPS receiver and storage unit. Data compression techniques can be used to increase the number of records that can be stored in the storage unit.

9 Claims, 9 Drawing Sheets

| Byte | Description | Content |
| --- | --- | --- |
| Byte 0 | Rockwell Binary Protocol Identifier | FE |
| Byte 1 | Status | Bit 0: Input I/O Status<br>Bit 3: GPS under navigation |
| Byte 2 | Number of satellite signal received | 8-bit integer |
| Byte 3 - 4 | GPS Week* | 16-bit little endian integer |
| Byte 5 - 7 | GPS Time* | 24-bit little endian integer |
| Byte 8 - 11 | Longitude* | 32-bit little endian integer |
| Byte 12 - 15 | Latitude* | 32-bit little endian integer |

Figure 6

| Byte | Description | Content |
| --- | --- | --- |
| Byte 0 | Compressed Data Identifier | FD |
| Byte 1 | Byte in the current positioning data different from the previous frame | 00 to 0F |
| Byte 2 | The contents of this byte | 8-bit integer |

Figure 7

VEHICLE OPERATION AND POSITION RECORDING SYSTEM INCORPORATING GPS

This application claims the benefit of Provisional Application No. 60/210,225, filed Jun. 6, 2000.

BACKGROUND OF THE INVENTION

1. Field of the Invention

The invention generally relates to a fleet management system; and in particular, the present invention relates to a vehicle operation and position recording system utilizing a global positioning system.

2. Discussion of the Related Art

For an owner of a large fleet of vehicles, monitoring the usage and the operation of the vehicles is essential for effective management. For example, for insurance or vehicle maintenance purpose, the fleet manager or the vehicle owner may wish to know at what speeds the driver has been driving a particular vehicle. The fleet manager may also wish to know the routes or streets the vehicle have been driven through to determine whether the most efficient routes have been used. In addition, the company may wish to obtain operational data on the vehicle, such as the gasoline usage, total miles driven, the driving and stopping times of the vehicles. Such information allows the company to better manage fuel and vehicle maintenance costs.

SUMMARY OF THE INVENTION

The vehicle operation and position recording system according to the present invention records positional and operational data of the vehicle. The recording device includes a GPS receiver, a control unit and a storage device. In one embodiment, the storage device stores information on a portable storage medium to allow the recorded information to be retrieved from the in-vehicle recording device readily. Alternatively, a communication port can be provided in the recording system to allow an external computer to retrieve the positional data and operational from the storage unit.

According to another aspect of the present invention, positional data is stored in the storage unit in a compressed format to take advantage of the slow changes in positional data even in a moving vehicle. In one embodiment, only values of fields of the current record that are changed from the immediately prior record are stored in the storage unit.

The present invention allows recording the positions of a moving vehicle onto a storage medium while the vehicle is operating. The stored positional data are later retrieved for subsequent analysis.

BRIEF DESCRIPTION OF THE DRAWINGS

FIG. 6 shows a full 16-byte data frame 600 used in storage unit 200.

FIG. 7 shows a compressed data record 700 used in storage unit 200.

Figure 1A:
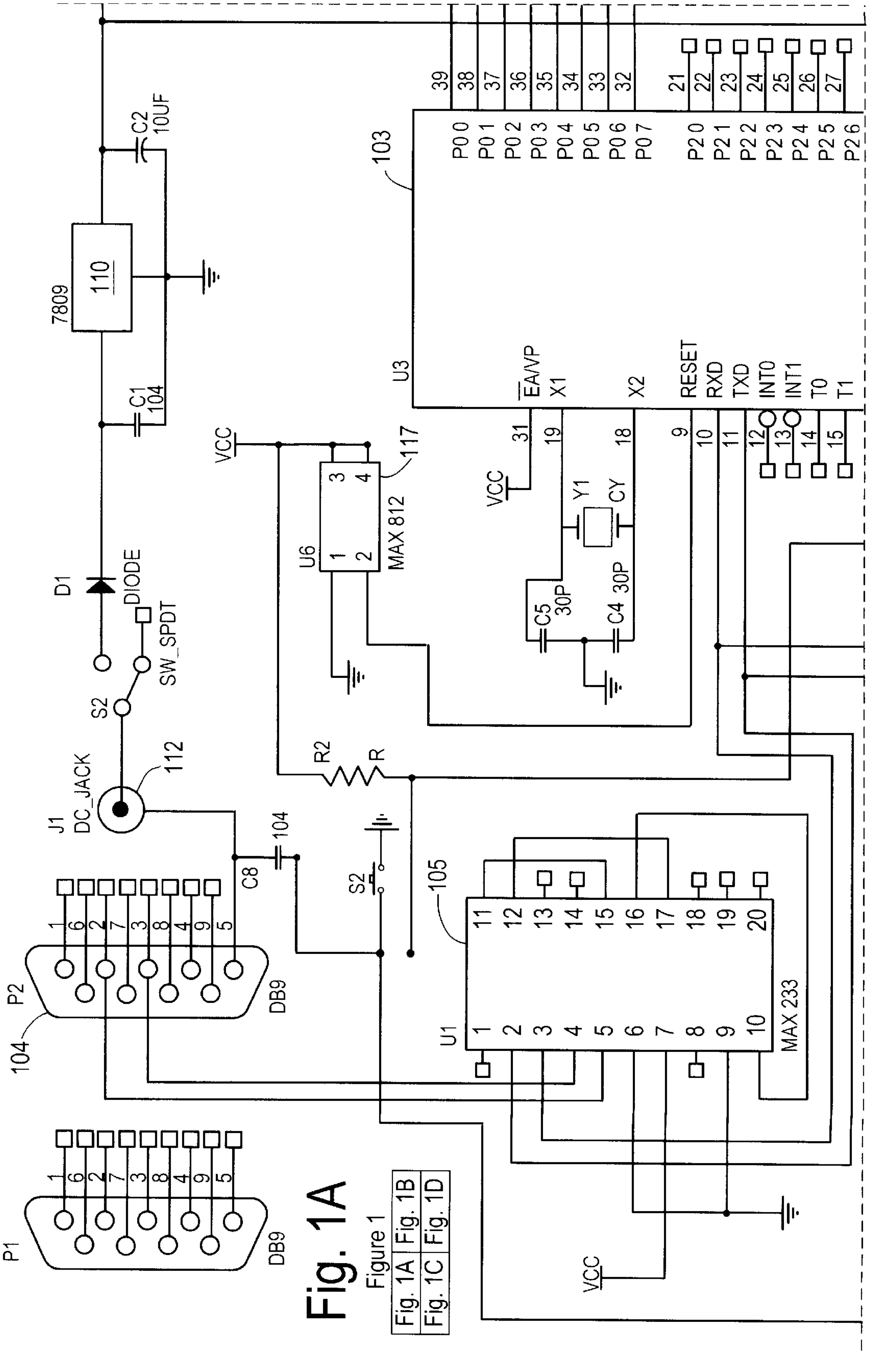
FIGS. 1A–1D is a schematic diagram of an in-vehicle recording device 100, in accordance with one embodiment of the present invention.
Figure 1B:
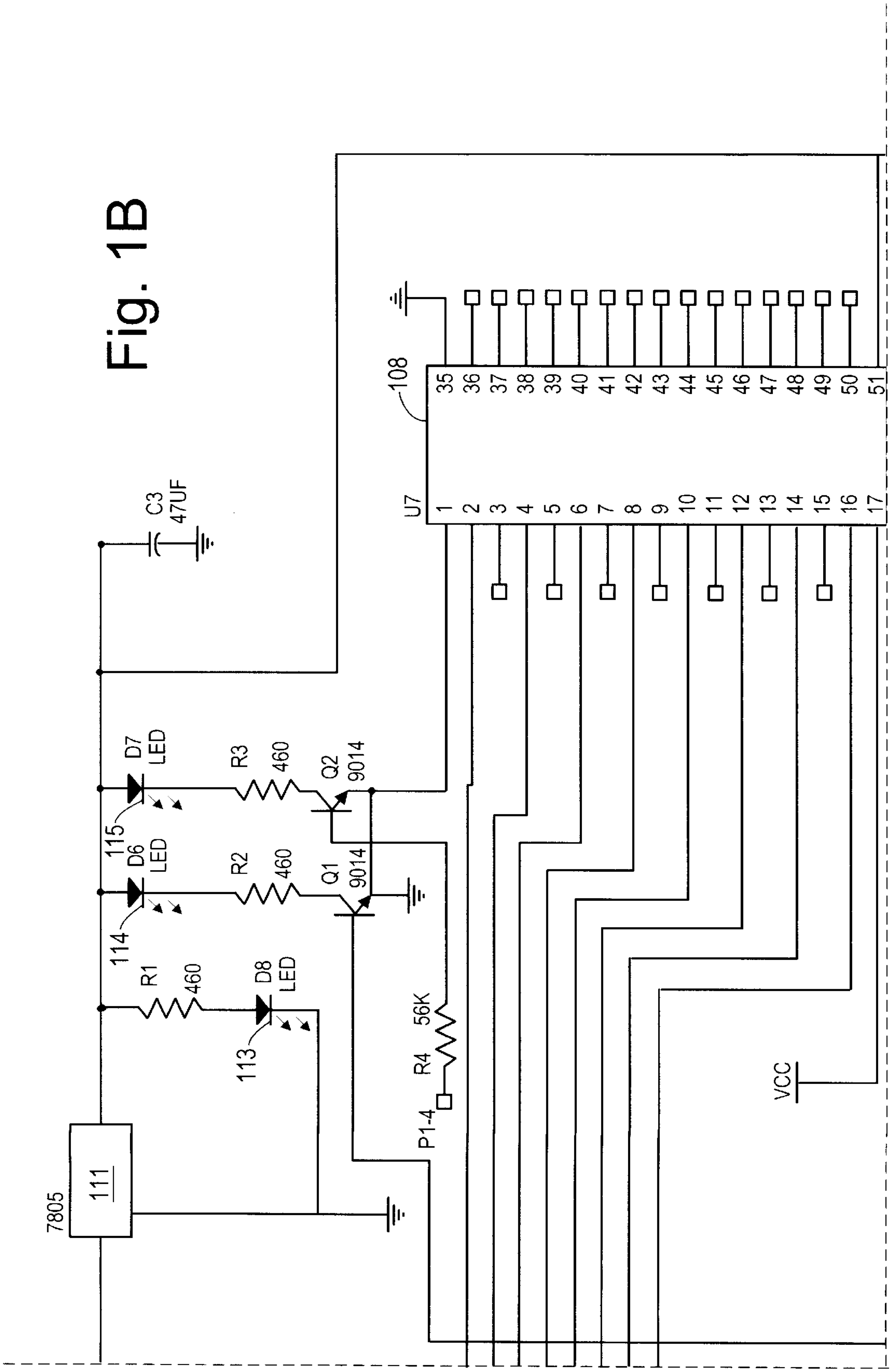
Figure 1C:
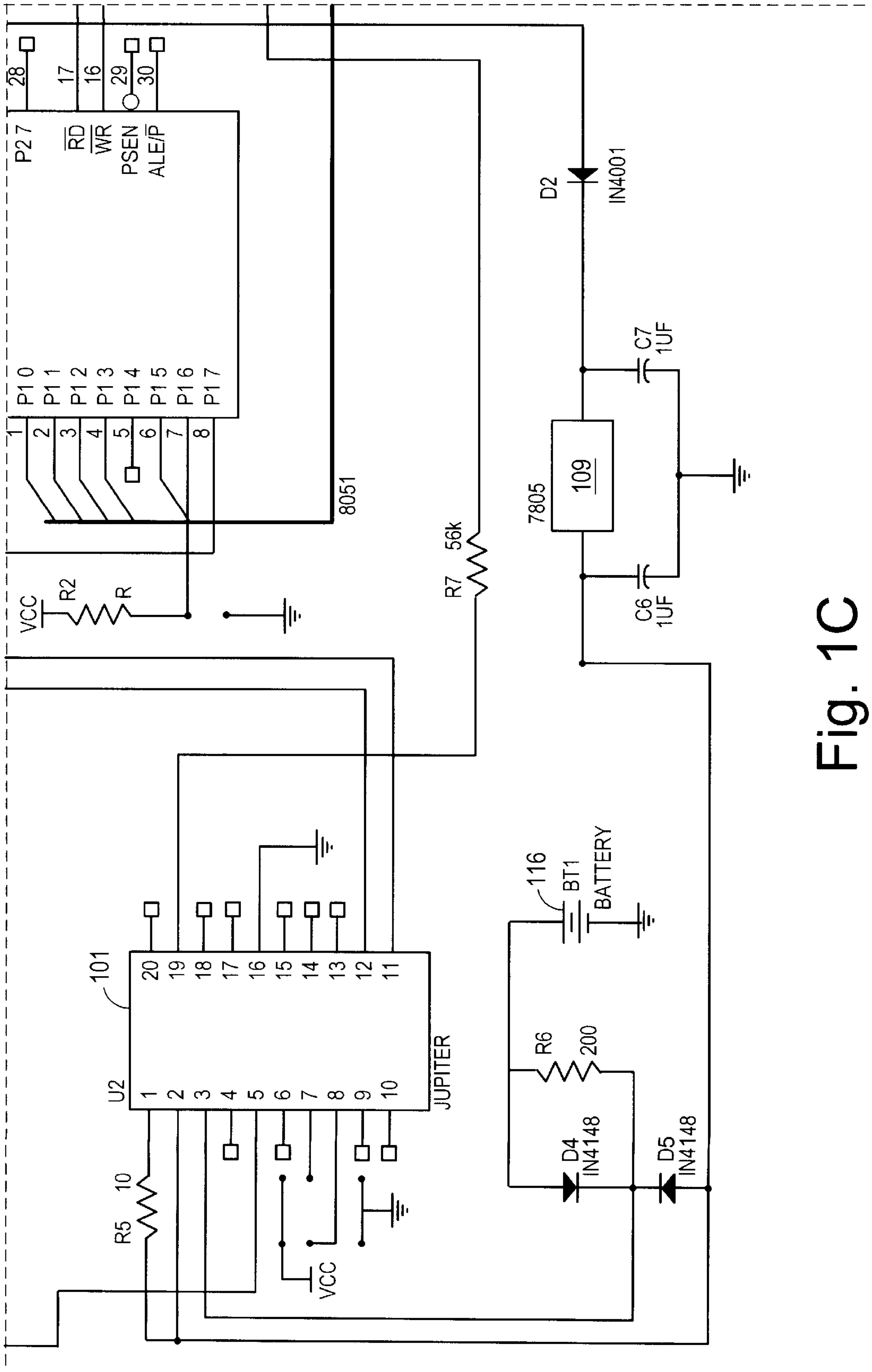
Figure 1D:
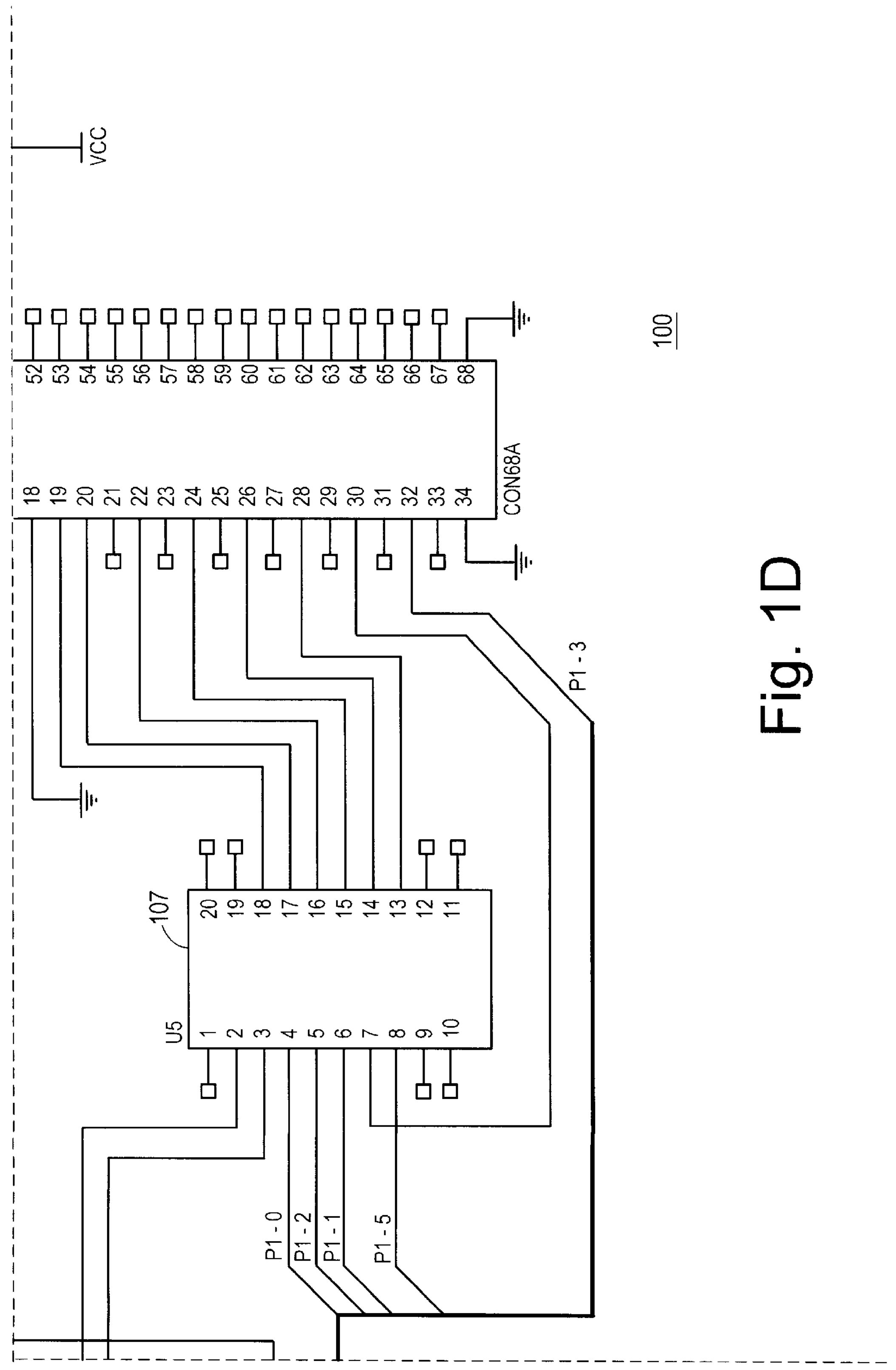

The present invention is better understood upon consideration of the detailed description below and the accompanying drawings.

DETAILED DESCRIPTION OF THE PREFERRED EMBODIMENTS

The present invention provides a vehicle operation and position recording system, which includes two components: an in-vehicle recording device and a base computer unit. The base computer unit, which retrieves and analyzes information stored in the in-vehicle recording device, can be implemented by any suitable computer, such as Intel Pentium-based personal computer.

FIGS. 1A–1D is a schematic diagram of an in-vehicle recording device 100, in accordance with one embodiment of the present invention. In-vehicle recording device 100 can be installed in a vehicle to monitor the various aspects of the vehicle's operation and its positions. In effect, the in-vehicle recording device functions in a way similar to the familiar "black box" found in airplanes.

As shown in FIGS. 1A–1D in-vehicle recording device 100 is controlled by microprocessor 103 running firmware stored in read-only memory (ROM) 107. Microprocessor 103 can be implemented, for example, by an industry standard 8051 type micro-controller. ROM 107 can be implemented by a suitable electronically programmable read-only memory (EPROM) device. In-vehicle recording device 100 interfaces with a global positioning system (GPS) receiver 102 (not shown) through connector 101 to allow in-vehicle recording device 100 to receive positional information from GPS. GPS receiver 102 can be a conventional GPS receiver circuit board, such as any GPS receiver circuit board based on the "Jupiter" chip set from Conexant Systems, Inc. In-vehicle recording device 100 also provides RS-232 port 104 for communication between in-vehicle recording device 100 and the vehicle's control system (not shown), which provides in-vehicle recording device 100 with such status and operational information as vehicle velocity, distance traveled, amount of fuel remaining in the fuel tank, and engine temperature. (Such information can be valuable in the maintenance of the vehicle). Alternatively, RS-232 port 104 can be used to couple an external modem to communicate with a base computer unit. For example, over RS-232 port 104, the base computer unit may retrieve the stored data from in-vehicle recording device 100. Microprocessor 103 controls RS-232 port 104 through a RS-232 driver/receiver integrated circuit 105, which translates voltage levels between the CMOS voltage levels used in microprocessor 103 and the standard voltage levels of RS-232 port 104. One suitable RS-232 driver/receiver integrated circuit is the Max233 integrated circuit available from Maxim Products Inc.

Figure 2:
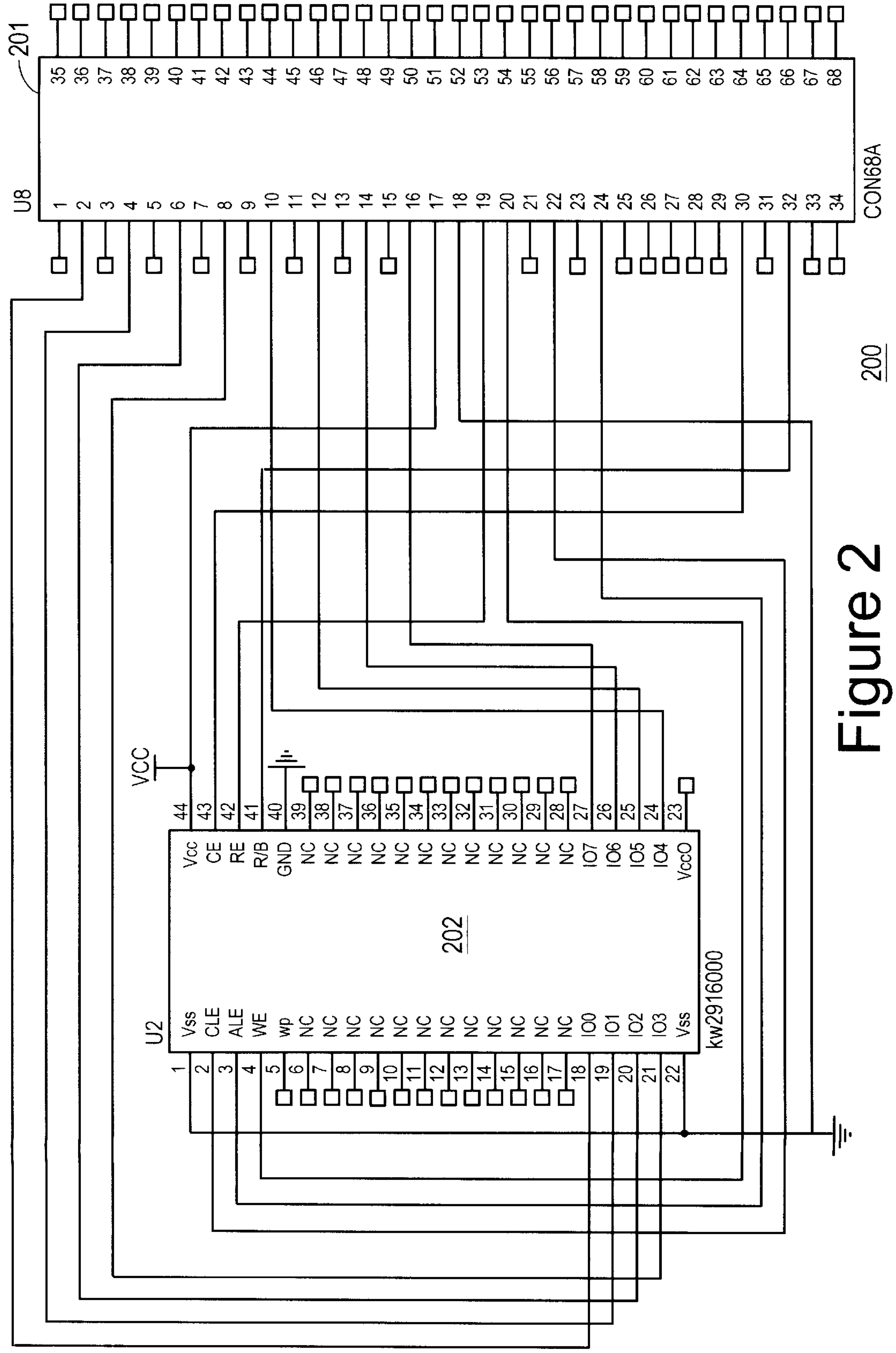
FIG. 2 is a schematic diagram of storage device 200 coupled to in-vehicle recording device 100, in one embodiment of the present invention.

In-vehicle recording device 100 records the operational and positional information of the vehicle onto a storage unit 200. In this embodiment, storage unit 200 can be implemented by a "flash" memory card communicating with in-vehicle recording device 100 over a PCMCIA interface. Connector 108 is provided in-vehicle recording device 100 to provide the physical PCMCIA interface. A flash memory card includes a flash memory integrated circuit, which is a nonvolatile memory device that can be electrically erasable and programmable. One implementation of storage device 200 is shown in FIG. 2. As shown in FIG. 2, in storage device 200, connector 201 is provided to mate with connector 108 of in-vehicle recording device 100. Storage device 200 includes a flash memory integrated circuit, such as the 16M-bit bit flash memory device KM29W16000 available from Samsung Electronics, Inc.

In this embodiment, in-vehicle recording device 100, GPS receiver 102 and storage device 200 can be powered by battery 116 or from the vehicle's DC source plugged into 12 volts power receptacle 112. A number of power regulator integrated circuits are provided to ensure a stable power supply is provided to the components of in-vehicle recording device 100. For example, voltage regulator 110 steps down the 12 volt supply to 9 volts and voltage regulators 109 and 111 provides 5 volts supplies to GPS receiver 102 and storage unit 200, respectively. Microprocessor 103 is provided a microprocessor supervisory circuit 117 to monitor its power supply. Voltage regulator 110 can be implemented by a 7809 voltage regulator, and voltage regulators 109 and 111 can be implemented by 7805 voltage regulators. 7809 and 7905 voltage regulators are available, for example, from Fairchild Semiconductor Corporation. Supervisory circuit 117 can be implemented, for example, by the MAX812 integrated circuit from Maxim Products, Inc.

Three light emitting diodes (LEDs) 113, 114 and 115 are provided for visual inspection of in-vehicle recording device 100's operations. LED 113 indicates that power is provided to in-vehicle recording device 100. During data collection operation, LED 114 is pulsed every second to indicate active operation (i.e., data transmitted to storage unit 200), and LED 115 is illuminated when storage unit 200 is full.

In-vehicle recording device 100 can be programmed to record information about the vehicle such as the vehicle's traveling time, the distance traveled, the vehicle's stopping time, and the number of stops made by the vehicle. Using GPS receiver 102, in-vehicle recording device 100 can record the positions along the route taken by the vehicle. Based on the time difference between positions, a velocity of the vehicle can also be computed. The stored data of invehicle recording device 100 can be used to determine whether the vehicle has been operated in excess of the legal speed limit or whether the vehicle has been driven outside a permissible area.

When storage unit 200 is full, or at appointed times, storage unit 200 can be removed from in-vehicle recording device 100 and read by a PCMCIA card reader in base computer unit. The base computer unit can be located at a home office where the fleet manager can monitor the operation of a fleet of vehicles. For example, vehicle information recorded by the in-vehicle recording device of each vehicle can be read back every week or once a month on the base computer unit. After reading or downloading the stored information into the base computer unit, storage unit 200 can be erased for reuse.

Figure 3:
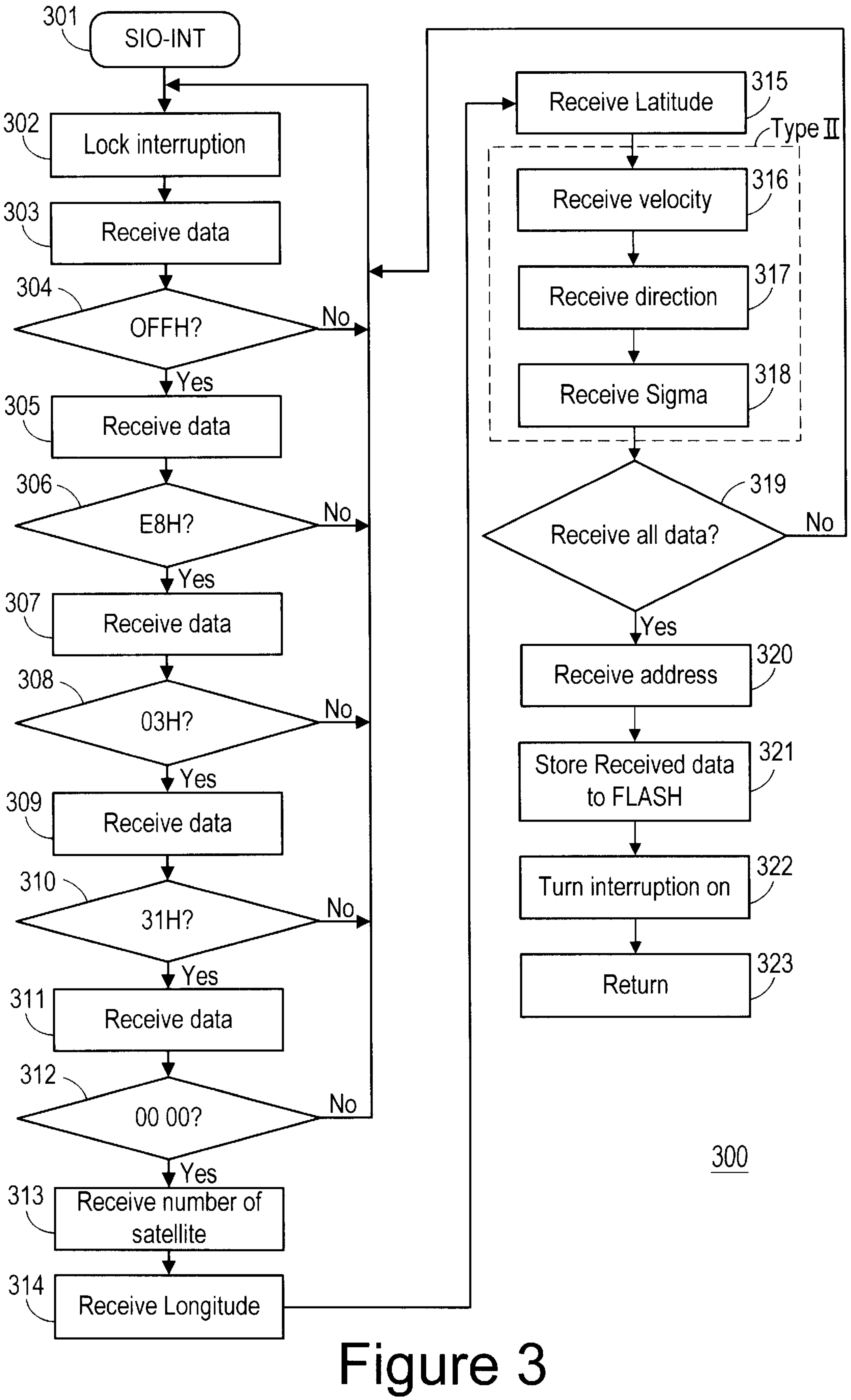
FIG. 3 is a flow chart 300 illustrating the operation of in-vehicle recording device 100 during data collection.

FIG. 3 is a flow chart 300 illustrating the operation of in-vehicle recording device 100 during data collection. As shown in FIG. 3, GPS receiver 102 interrupts microprocessor 103 to provide microprocessor 103 positional information. At step 301, microprocessor 103 services the interrupt by branching to the interrupt service routine which, upon entry, disables further interrupts (step 302). The firmware then, at steps 303–312, examines successive received 8-bit data for the hexadecimal sequence "FF E8 03 31 00", which serves as a preamble to a GPS data packet. If, at any of steps 303, 305, 307, 309 and 311, the expected character in the sequence is not received, the firmware returns to step 302, until the expected sequence is received. When the expected sequence is received (i.e., step 312), the successive bytes received at steps 313–315, respectively, are the satellite number (which identifies the satellite providing the GPS data), the longitude and the latitude. In one embodiment, where GPS receiver 102 is enabled to provide velocity, direction and "sigma" (a statistical measure of variation), the firmware is programmed to receive these values at steps 316–318. At step 319, if the firmware is programmed to receive additional GPS data packets, the firmware repeats steps 302–319 until all data packets are received. At step 320, the firmware retrieves the next address of the storage location in storage unit 200 and writes the received data as records in storage unit 200 at step 321. Interrupt is then renabled (step 322), and the firmware exits the interrupt handler at step 323.

According to another aspect of the present invention, a data compression scheme can be provided in storage unit 200. In this embodiment, the full or "basic" positional data record is stored in a 16-byte frame, as shown in FIG. 6. In FIG. 6, full 16-byte data frame 600 includes (a) a protocol identifier having hexadecimal value "FE" (byte 0), (b) a status byte (byte 1) indicating input I/O status at bit 0 and GPS operational at bit 1, (c) a 8-bit value identifying the GPS satellite (byte 2), (d) a 16-bit value representing the "GPS week value (bytes 3–4), (e) a 24-bit value representing the "GPS time" value (bytes 5–7), (f) a 32-bit value representing the longitude (bytes 8–11) and (g) a 32-bit value representing the latitude (bytes 12–15). In this embodiment, the protocol identifier in byte 0 also indicates the beginning of a full frame.

Since position changes slowly relative to the data acquisition frequency even in a moving vehicle, each GPS record is likely to be the same as the immediately previous record, or differs from the immediately previous record in only one byte. When there is no change from the immediately previous GPS record or if the current record differs from the immediately previous record in one byte, the current record is represented by the hexadecimal value "FD" in byte 0, to indicate a compressed frame. If the current record differs from the immediately previous record one byte, the value difference in the changed byte is provided in the next 2 bytes of the compressed frame, as shown in FIG. 7. FIG. 7 shows compressed data record 700 having the structure: (a) compressed record identifier "FD" (byte 0), (b) an 8-bit index pointing to the location of the changed byte (byte 1), and (c) the value of the changed byte. For example, if the value "FD0203" following a full frame "FE 08 04 3D04 00AC01 43145802 EFAADDOB", then "FD0203" represents that byte 2 in the current frame has a hexadecimal value of "03" and all other bytes are unchanged (i.e., the current frame represents the value "FE 08 03 3D04 00AC01 43145802 EFAADDOB"). When in-vehicle recording device 100 is reset, or when a new full frame is written, the firmware writes a 8-bit value "FF" to signal the transition. Thus, significant space savings can be realized under this data compression scheme.

Figure 4:
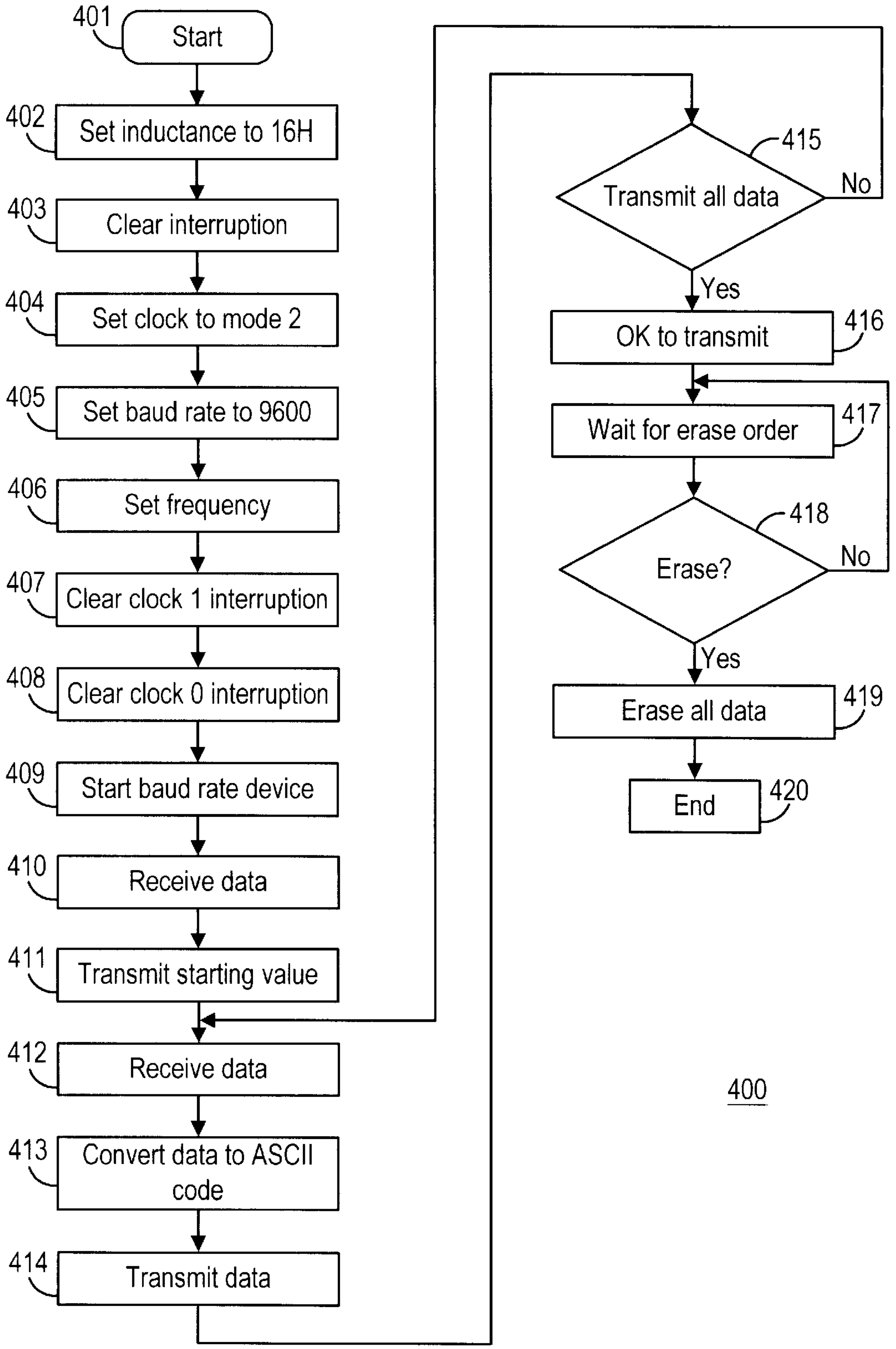
FIG. 4 is a flow chart 400 illustrating the operation of in-vehicle recording device 100 during data transmission.

FIG. 4 is a flow chart 400 illustrating the operation of in-vehicle recording device 100 during data transmission to a base computer unit over communication port (e.g., RS-232 port 104). At the beginning of a transmission session, the firmware sets microprocessor 103's internal stack pointer to point to location 16H (step 402), and enables interrupt (step 403). Next, at step 404, timer 2 of microprocessor 103 is set to mode 2, which allows timer 2 to be a baud rate generator for serial output port. In baud rate generator mode, timer 2 is set to generate a 9600 baud rate (step 405), the frequency of the transmit clock is set at step 406, and an ascii character "#" is sent to the base computer unit. Interrupts for timers 0 and 1 are also enabled at steps 408 and 407, respectively. Timer 1 is used as baud rate generator for receiving data from the base computer unit, and baud rate for receiving data from the base computer unit is set at step 409. The firmware then waits at step 410 for the base computer unit to send the ascii sequence "OK" in response to the earlier "#" character. Upon receiving "OK", the firmware then sends, at step 411, the ascii "$" character ("start character") to indicate readiness for receiving commands from the base computer unit. If the base computer unit desires to retrieve positional data stored in storage unit 200, the base computer sends the ascii "&" character (i.e., "send data command"), which is received by in-vehicle recording device 100 at step 412. In-vehicle recording device then retrieves the next record from storage unit 200, and transmits the record as a string of ascii characters at steps 413–414. (Conversion from an 8-bit byte value to 2 ascii characters is discussed with respect FIG. 5 below). If the current record is not the last record, the firmware return to step 412 to receive the next send data command. Otherwise, at step 416, in response to the next send data command, the firmware sends the base computer unit the ascii sequence "OK" to indicate completion of data transmission, and waits at step 417 for a response from the base computer unit. Upon receiving "OK" from in-vehicle recording device 100, the base computer unit sends an erase data command to in-vehicle recording device 100. Upon receiving the erase command (step 418), all data are erased (or marked for being written over) at step 419.

Figure 5:
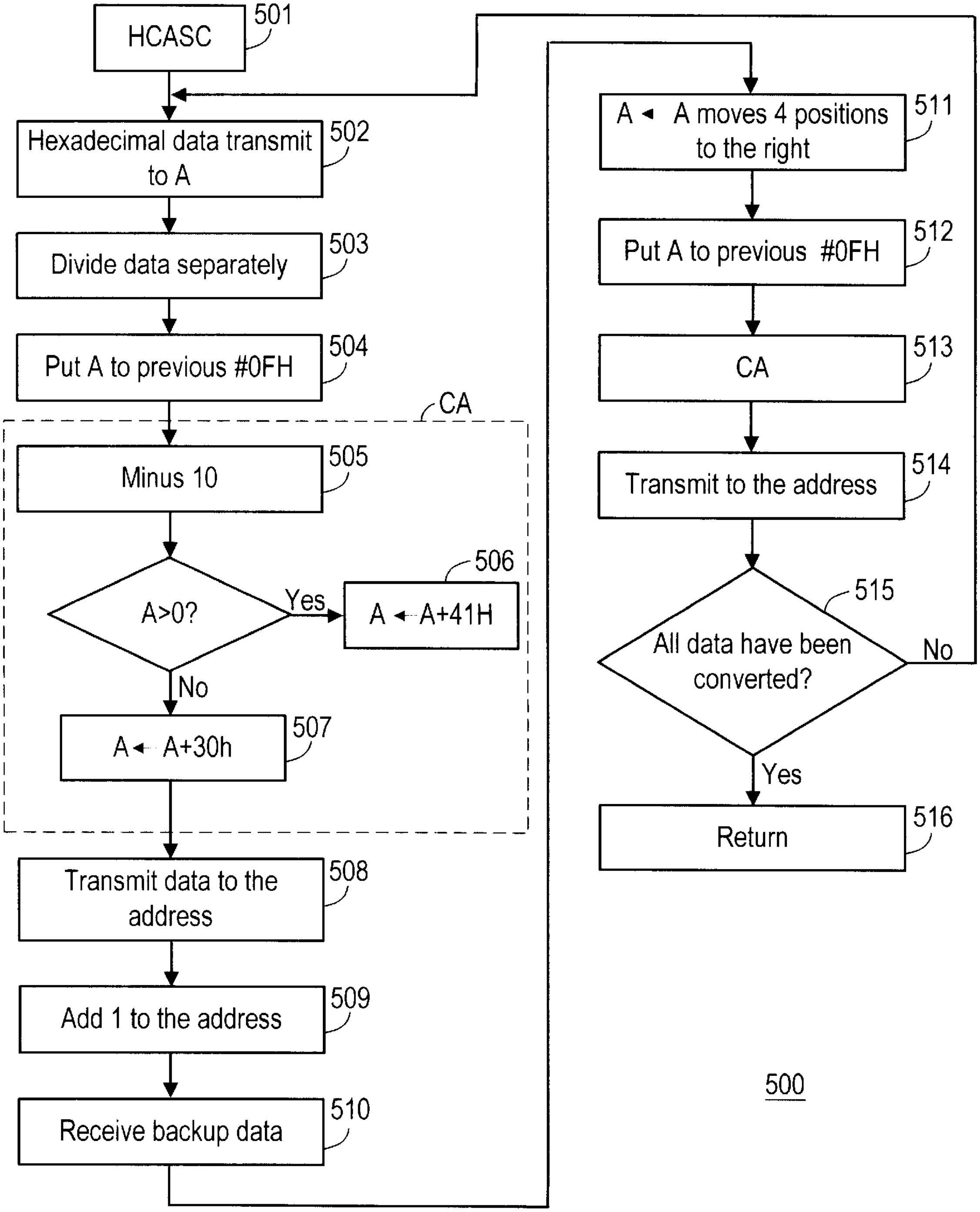
FIG. 5 is a flow chart 500 illustrating the procedure for translating 8-bit hexadecimal values into ascii characters.

FIG. 5 is a flow chart 500 illustrating the procedure for translating 8-bit hexadecimal values into ascii characters. As shown in FIG. 5, at step 502, an 8-bit byte of data is written into register or accumulator A. At step 503, a copy of the byte ("back up value") is stored in another register. At step 504, the current value in accumulator A is bitwise ANDed with the hexadecimal value "OF" to return to accumulator A the least significant nibble (i.e., 4 bits) from the byte. Then, at step 505, the hexadecimal value 10 is subtracted from the byte. At step 507, if the resulting value from the subtraction is less than 0 (i.e., the byte has value between 0 and 9), a hexadecimal value 30H is added to the "original" value in accumulator A (i.e., the value in accumulator A before subtraction at step 505) and returned. Otherwise, i.e., the original value is between A and F, the original value is added to hexadecimal value 41H (step 507). The value now stored in accumulator A is the ascii character corresponding to the original value in accumulator A. This value is then transmitted to an indexed location in a buffer. (To simplify the discussion, the procedures of steps 505–507 is referred to as "step CA"). At step 508, the index to the buffer is incremented to indicate the next data location. The back up value is then retrieved into accumulator A. At step 511, the value in accumulator A is right-shifted 4 bit positions, so that the upper or more significant nibble becomes the lower or less significant nibble. Again, at step 512, the current value in accumulator A is bitwise ANDed with the hexadecimal value 0F. The procedure of step CA is then repeated at step 513 to derive the corresponding ascii character to the lower nibble. This ascii character is then written to the current indexed location of the buffer. Steps 502–514 are repeated until all data have been converted.

The embodiments described above are illustrative only and do not limit the invention. Furthermore, the present invention is not limited to any particular hardware/software implementation. In fact, hardware, software, or any combination thereof other than those described herein may be used in accordance to the principles of the invention.

We claim:

1. An in-vehicle recording device mounted in a vehicle, comprising:

an interface to a GPS receiver, said interface receiving positional data from said GPS receiver;

a storage unit; and a control unit, said control unit causing said positional data to be written into said storage unit;

wherein said positional information is stored as a sequence of records of defined data format, said data format including a series of bytes of data, each byte having a defined meaning, wherein said control unit compares each byte of each successive record to the corresponding byte of the preceding record, and wherein if a single byte of a given record changes with respect to the preceding record, said control unit does not store the unchanging bytes, but stores only the byte varing from one record to the next, together with an identification that the given record is being stored in abbreviated format, and an indentification of the varying byte.

2. An in-vehicle recording device as in claim 1 comprising a removable storage medium.

3. An in-vehicle recording device as in claim 2, wherein said removable storage medium comprises a PCMCIA format card.

4. An in-vehicle recording device as in claim 1, wherein said storage unit comprises a non-volatile memory integrated circuit.

5. An in-vehicle recording device as in claim 1, herein said abbreviated record is identified by a predetermined value in a designated field of said abbreviated record.

6. An in-vehicle recording device as in claim 1, further comprising a communicating port for interfacing with an external computer over a modem.

7. An in-vehicle recording device as in claim 6, wherein firmware in said control unit allows said external computer to retrieve said position data from said storage unit over said communication port.

8. An in-vehicle recording device as in claim 6, wherein said communication port comprises a serial port.

9. An in-vehicle recording device as in claim 6, wherein firmware in said control unit allows said external computer to erase positional data stored in said control unit.

* * * * *